United States Patent

[11] 3,591,728

[72] Inventor Michael J. Birck
Clarendon Hills, Ill.
[21] Appl. No. 526,785
[22] Filed Feb. 11, 1966
[45] Patented July 6, 1971
[73] Assignee Western Electronics Development Corporation
San Angelo, Tex.

[54] LOCAL RINGING AND RING-TRIP RELAY FOR CARRIER TERMINAL

3 Claims, 1 Drawing Fig.

[52] U.S. Cl. .......... 179/84, 179/16, 179/2.5
[51] Int. Cl. .......... H04m 1/00, H04m 3/06
[50] Field of Search .......... 179/16.45, 16.4, 84, 43, 2.5, 2.5 C, 15, 18.82, 63

[56] References Cited

UNITED STATES PATENTS 1,733,130 10/1929 Niles et al. .......... 179/84
1,748,754 2/1930 Carter .......... 179/84
2,842,622 7/1958 Bakker .......... 179/43

*Primary Examiner*—William C. Cooper
*Attorney*—Roy B. Moffitt

ABSTRACT: A telephone subscriber's terminal having a telephone apparatus and a transmitter and receiver carrier terminal unit adapted to be connected by a signal transmission line to a central office terminal. Relay actuated transfer contacts interconnecting the telephone apparatus and the carrier are actuated in response to a central office-produced ringing signal to disconnect the telephone apparatus from the carrier and to connect it to a local ringing generator for signalling the incoming call. When the telephone apparatus is transferred from its high impedance onhook state to its relatively low impedance offhook state a control relay is energized through a rectifier bridge by increased current drawn from the local ringing generator, and energization of the control relay results in actuation of the transfer contacts to disconnect the telephone apparatus from the local generator and to connect it back to the carrier. A resistance connected across terminals of the rectifier bridge provides a voltage drop that prevents energization of the control relay when the telephone apparatus is on the onhook state.

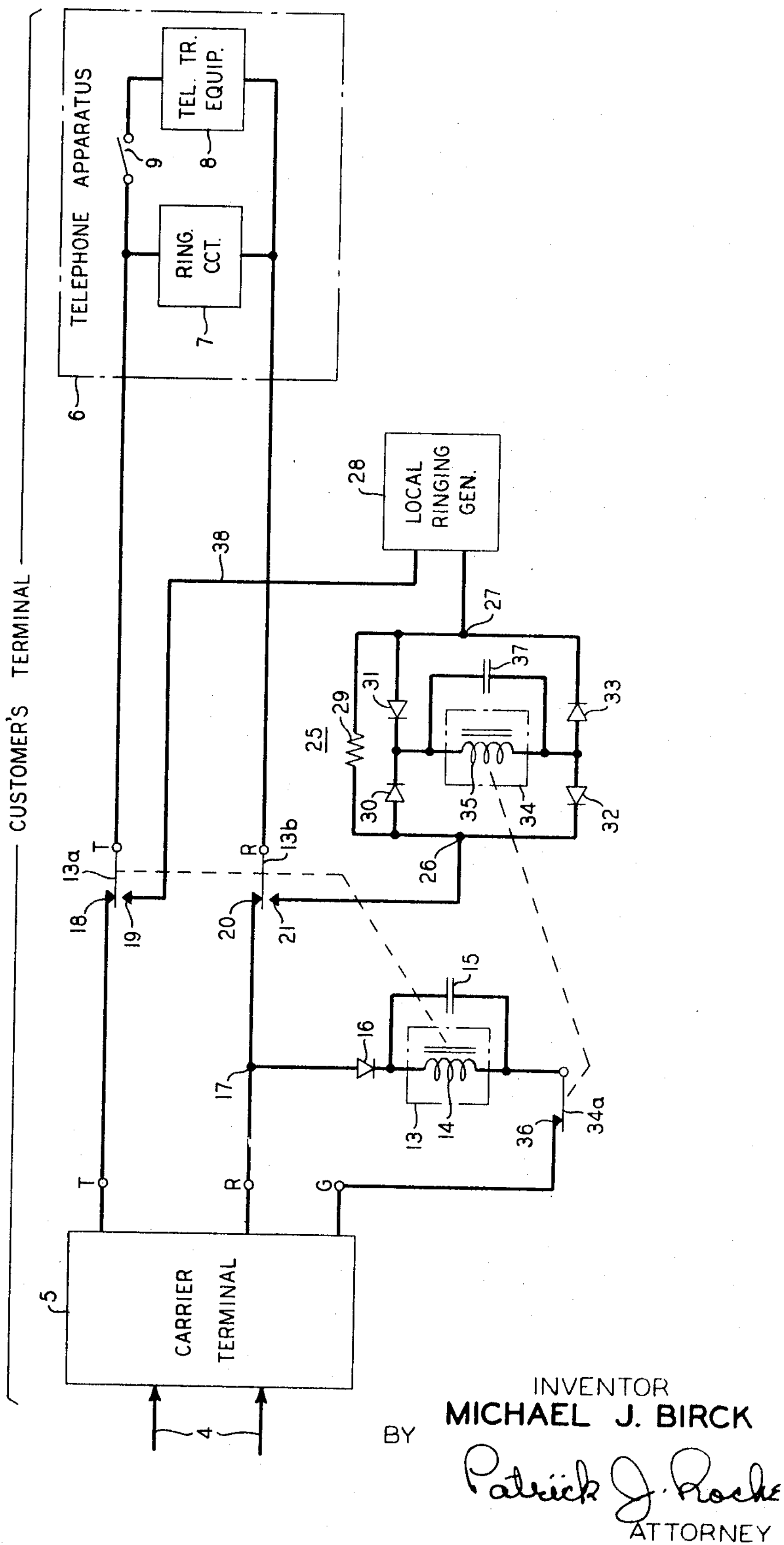
INVENTOR
MICHAEL J. BIRCK
BY Patrick J. Roche
ATTORNEY

LOCAL RINGING AND RING-TRIP RELAY FOR CARRIER TERMINAL

This invention relates to a telephone signaling system, and more specifically to such system including a circuit arrangement for providing a local ringing voltage at the tip and ring conductors of a customer's telephone apparatus in response to a ringing voltage incoming at the ring and ground conductors of the same customer's carrier signaling terminal.

The prior art includes a customer's telephone apparatus having tip and ring terminals to which talking, supervisory and ringing voltages are directly applied from an incoming two-wire signaling transmission line having corresponding tip and ring conductors. In one type of customer's carrier terminal connected to a two-wire carrier signaling line and provided with tip, ring and ground terminals of which the ring and ground terminals service the incoming ringing voltages and of which the tip and ring conductors service the talking, dialing and supervisory signals, a problem is presented as to how to utilize the ringing voltage incoming to the ring and ground terminals at the carrier terminal for providing ringing voltages at the tip and ring conductors of the telephone apparatus. One carrier signaling terminal of the foregoing type is disclosed in my copending application Ser. No. 493,862, filed Oct. 7, 1965, now U.S. Pat. No. 3,491,207. This problem is particularly acute with regard to key-operated telephone systems used extensively in commercial installations serviced with three terminal signaling circuits of the type previously mentioned.

The present invention contemplates a local telephone customer's circuit arrangement for translating a ringing voltage incoming at the ring and ground terminals of a carrier signaling terminal into a corresponding local ringing voltage generated at the same customer's telephone apparatus for application to the tip and ring terminals thereof.

A principal object of the present invention is to extend the use of three-terminal telephone signaling circuits with two-terminal key-operated telephone apparatus.

Another object is to widen the utility of key-operated telephone apparatus.

A further object is to translate an incoming ringing voltage into a corresponding local ringing voltage generated at a customer's telephone apparatus.

An additional object is to provide a facile circuit adaptation for expeditiously transferring ringing voltage from the ring and ground terminals of a customer's carrier signaling terminal to the tip and ring terminals of the same customer's telephone apparatus without regard to the transmission circuitry providing tip and ring signaling transmission.

Still another object is to interrupt immediately both an incoming ringing voltage and a corresponding ringing voltage generated locally at the customer's telephone apparatus n response to an offhook operation thereof.

A still further object is to apply a locally generated ringing voltage to a customer's telephone apparatus only while a corresponding ringing voltage is being applied to the same customer's carrier signaling terminal.

Another object is to disconnect a customer's telephone apparatus from a talking, dialing and supervisory recognition circuit while a locally generated ringing voltage is being supplied to such apparatus.

One type of customer's carrier signaling terminal includes telephone apparatus comprising tip and ring terminals connected to two parallel branches a first of which includes a high-impedance telephone ringing and a second of which includes a receiver of a key-operated telephone apparatus, together with a carrier signaling terminal provided with tip, ring and ground terminals of which the ring and ground conductors receive an incoming ringing voltage for application to the tip and ring terminals of the telephone apparatus. It is understood that when a telephone receiver of such apparatus is operated onhook, the above-mentioned second parallel branch is an open circuit whereby only the high-impedance ringing circuit of the first branch is connected to the telephone apparatus tip and ring terminals; and further that when the telephone receiver of such apparatus is operated offhook, the second parallel branch is a low-impedance talking circuit connected in shunt of the high-impedance ringing circuit. A two-wire transmission line interconnects the customer's carrier terminal and central office for transmitting talking, dialing and supervisory signals therebetween in the manner, for example, disclosed in my copending application, supra.

In association with the aforementioned customer's carrier terminal, a specific embodiment of the present invention comprises a customer's circuit arrangement for applying a locally generated ringing voltage to the telephone apparatus tip and ring terminals in response to and in correspondence with an incoming ringing voltage effective at the carrier terminal ring and ground terminals. This arrangement includes a first electromagnetic relay having an operating winding and two transfer contacts, one connected to the tip terminal of the telephone apparatus and the other to the ring terminal thereof, each transfer contact movable between a pair of fixed contacts, one contact of a first pair of fixed contacts connected to the tip terminal of the carrier terminal and one contact of a second pair of fixed contacts connected to the ring terminal thereof, and the relay operating winding connected in a half-wave rectifying circuit including the carrier terminal ring and ground terminals. A local generator of ringing voltage is connectable via a full-wave bridge rectifier and second contacts of each of the first and second pairs of fixed contacts to the telephone apparatus tip and ring terminals and thereby to the two parallel branches included therein as above identified. A second electromagnetic relay has an operating winding connected in the bridge rectifier and a normally closed contact connected in the half-wave rectifying circuit including the first relay operating winding.

The present invention operates in the following manner. When an incoming ringing voltage is not effective at the ring and ground terminals of the carrier terminal, the operating windings of the first and second relays are deenergized whereby the associated relays are unoperated so that a talking, dialing and supervisory circuit is completed via a direct current connection between the tip and ring terminals of the carrier terminal and telephone apparatus. When, however, an incoming ringing voltage is effective via the two-wire transmission line at the ring and ground terminals of the carrier terminal in response to an incoming call initiated by a distant calling party, this ringing voltage is rectified in the half-wave rectifying circuit to energize the first relay operating winding. The first relay then operates to actuate its two transfer contacts to engage the second contacts of the first and second pairs of fixed contacts thereby interrupting the talking circuit or direct current connection between the carrier terminal and telephone apparatus tip and ring terminals and at the same time applying the ringing voltage from the local ringing generator across the tip and ring conductors of the telephone apparatus. This ringing voltage activates the ringing circuit. As the telephone apparatus is now operated to onhook, it may be said to be adjusted to the high impedance state whereby only a small amount of local ringing current flows in the high-impedance circuit including the telephone ringing circuit and local ringing generator. At this time the full-wave rectifier bridge fails to provide sufficient current to energize the operating winding of the second relay which remains unoperated.

As the called party at the customer's terminal responds to the ringing of his telephone apparatus by picking up the receiver, a low-impedance telephone talking circuit is now caused to shunt the high-impedance ringing circuit. As a result a considerably larger amount of local ringing current flows in the circuit including the low-impedance telephone talking circuit and local ringing generator. It is thus apparent that such ringing current increase takes place only when the local telephone receiver is picked up during the incoming ringing cycle. This enables the full-wave bridge rectifier to provide sufficient current to energize the operating winding of the second relay which thereupon operates to open its normally closed contact thereby opening the above-traced half-wave rectifying circuit. This serves to interrupt the incoming ringing voltage effective at the carrier terminal ring and ground terminals thereby deenergizing the operating winding of the first relay. This relay is thereby caused to return to the unoperated condition whereupon the two transfer contacts associated therewith are returned to engage the one contacts of the first and second pairs of fixed contacts. This reestablishes the talking circuit between the carrier terminal and telephone apparatus tip and ring terminals and at the same time interrupts the ringing voltage applied to the telephone apparatus tip and ring terminals from the local ringing generator. This reestablishment of the talking circuit as just mentioned enables the called party at the customer's carrier terminal to answer vocally to the calling party connected to the latter terminal extended through the central office to the distant telephone apparatus of the calling party. When the called party returns the receiver to its cradle, the high impedance is reestablished across the ringing circuit which is then conditioned to await activation by the next succeeding incoming ringing voltage initiated at the central office by another calling party whereupon the foregoing operation is repeated.

A feature of the present invention is an expeditious transition of an incoming ringing voltage effective at the ring and ground terminals of a customer's carrier terminal to a locally generated ringing voltage applied to the tip and ring terminals of the same customer's telephone apparatus. Another feature is the immediate interruption of incoming and local ringing voltages in response to an operation of the customer's telephone apparatus from onhook to offhook, irrespective of whether this occurs during a ringing cycle or the silent interval between successive ringing cycles. Still another feature is that a locally generated voltage is applied to the customer's telephone apparatus only while a corresponding incoming ringing voltage is effective at the customer's carrier terminal. An additional feature is a facile connection of the tip and ring terminals of a customer's key-operated telephone apparatus to the ring and ground terminals of the same customer's carrier terminal for ringing purposes.

The invention is readily understood from the following description taken together with the accompanying drawing which is a schematic circuit of a customer's telephone terminal including a specific embodiment of the present invention.

The circuit illustrates a customer's terminal comprising a two-wire incoming transmission line 4 connected to a carrier terminal 5 provided with tip, ring and ground terminals T, R and G, respectively, and telephone apparatus 6 including a high impedance ringing circuit 7 and telephone transmission equipment 8 having a normally open switch 9 illustrating a telephone receiver operated to an onhook state for the purpose of this description. This telephone apparatus may comprise either a conventional type of PBX equipment or a key-operated telephone system of a well-known type. It is obvious that while the telephone apparatus is illustrated in a simple form in the drawing for the purpose of this description, it may comprise a relatively complex multifacility key system having an audiovisual signaling facility and readily comprehended by those familiar with the telephone art. Talking, dialing and supervisory signals incoming on line 4 to the carrier terminal are transmitted therefrom to the telephone apparatus in a manner that is presently explained. An additional understanding of the above-described circuit may be obtained by reference to my copending application, supra.

It is understood for the purpose of this description that the telephone apparatus is adjusted to a high resistance or impedance state when the telephone transmission equipment is operated to onhook whereby switch 9 is open and only the ringing circuit is connected across the telephone apparatus tip and ring terminals T and R. This is so for the reason that the ringing circuit is provided with an effective resistance in an amount greater than 2000 ohms. It is also understood that the telephone apparatus is adjusted to a low resistance or impedance state when the telephone transmission equipment is operated to offhook whereby switch 9 is closed to establish a talking circuit impedance of approximately 200 ohms or less to the ringing voltage via the telephone transmission equipment. Thus, the 200-phm talking circuit is connected in shunt of the 2000-ohm ringing circuit. The operational effects in the above-described circuit resulting from such high impedance and low impedance states are discussed in detail hereinafter. It is further understood that the two-wire line serves to transmit talking, dialing, supervisory and ringing voltages between the carrier terminal and a telephone central office, not show, connectable to distant telephone subscribers in accordance with techniques well-known to the telephone art.

In accordance with a specific embodiment of the present invention, a relay 13 comprises an operating winding 14, a capacitor 15 connected across the latter winding for a purpose mentioned hereinafter, and two transfer contacts 13*a* and 13*b* which are permanently connected to tip and ring terminals T and R, respectively, of the telephone apparatus. Transfer contact 13*a* is actuable to engage either one of two fixed terminals 18 and 19 and transfer contact 13*b* is actuable to engage either one of two fixed terminals 20 and 21 in a manner and for a purpose that are subsequently identified. Fixed terminals 18 and 20 are permanently connected to tip and ring terminals, T and R, respectively, of the carrier terminal. A diode 16 connects one end of relay operating winding 14 to a point 17 common to the carrier terminal ring terminal R and fixed contact 20. The opposite end of this winding is connected to the carrier terminal ground terminal in a manner that is subsequently explained. It is understood that diode 16 may be replaced by a bridge rectifier for a purpose that is later pointed out.

A bridge rectifier network 25 has a first terminal 26 connected to fixed contact 21 and a second terminal 27 to one terminal of a local generator 28 of ringing voltage, which is also connected via another terminal and lead 38 to fixed contact 19. This rectifier network includes three parallel branches connected between its two terminals 26 and 27, viz., a first branch including a resistor 29, a second branch including diodes 30 and 31 connected in series and poled in a direction toward each other, and a third branch including diodes 32 and 33 connected in series and poled in a direction away from each other. Resistor 29 serves a purpose that is subsequently mentioned. A relay 34 includes an operating winding 35 having one end connected to a point common to diodes 30 and 31 and an opposite end to a point common to diodes 32 and 33. This relay also includes a contact 34*a* which is normally closed on a fixed contact 36 both of which are connected to the carrier terminal ground terminal G in series with relay operating winding 14, diode 16, common point 17, and carrier terminal ring terminal R in a half-wave rectifying circuit. A capacitor 37 connected in parallel with relay operating winding 35 serves a purpose that is later mentioned. It is understood that diode 16 may be replaced with a bridge rectifier similar to bridge rectifier 25, but omitting resistor R, for providing full-wave rectification if it is so desired.

The operation of the above-described circuit takes place in the following manner. Let it in initially assumed that the overall circuit is initially adjusted to the condition shown in the drawing. This means that relay 13 is deenergized so that its transfer contacts 13*a* and 13*b* engage fixed contacts 18 and 20, respectively, to establish a continuous direct current circuit between the carrier terminal and telephone apparatus tip and ring terminals. This direct current circuit serves to transmit talking and supervisory signaling voltages between the carrier terminal and telephone apparatus. At this time, it is also assumed that ringing voltage is not effective at the carrier terminal ring and ground terminals and the telephone apparatus is adjusted to the high impedance state for the reason that the telephone transmission equipment is now operated to onhook.

It is readily apparent from such initially assumed condition of the overall circuit shown in the drawing that the bridge rectifier network and local ringing generator are disconnected from transfer contacts 13*a* and 13*b* at the respective fixed contacts 19 and 21, and thereby from the telephone apparatus tip and ring terminals.

Let it now be assumed that an alternating current ringing voltage of 20 cycles-per-second, for example, incoming on line 4 is effective between the carrier terminal ring and ground terminals. This voltage is rectified via rectifier diode 16 in a half-wave rectifying circuit serially including the carrier terminal ring terminal R, common point 17, diode 16, relay operating winding 14, contact 34*a* normally closed on fixed contact 36, as relay 34 is now deenergized, and carrier terminal ground terminal G. As previously indicated full-wave rectification of the incoming ringing voltage may be provided at this point in the circuit if it is so desired. This rectified voltage effective across capacitor 15 provides sufficient current to energize relay operating winding 14 whereby relay 13 is operated to actuate its transfer contacts 13*a* and 13*b* to engage fixed contacts 19 and 21, respectively. This capacitor smooths or filters the rectified voltage. This completes an obvious circuit via these engaging contacts and the bridge network to the local ringing generator. At this moment, it is apparent that the direct current circuit previously identified as interconnecting the carrier terminal and telephone apparatus is now interrupted at the transfer contacts 13*a* and 13*b* thereby precluding the transmission of talking, dialing and supervisory signaling voltages via these transfer contacts and the direct current circuit formerly extending between the carrier terminal and telephone apparatus tip and ring terminals. It is noted that the local ringing voltage does not appear across the carrier terminal tip and ring terminals.

As a consequence of the engagement of transfer contacts 13*a* and 13*b* with fixed contacts 19 and 21, respectively, as just mentioned, the local ringing generator applies a 20 cycle-per-second alternating current ringing voltage, for example, identical with that of the ringing voltage incoming on line 4, via the bridge rectifier network, engaging transfer contacts 13*a* and 13*b* and fixed contacts 19 and 21, respectively, across the tip and ring terminals T and R, respectively, of the telephone apparatus. This local ringing voltage activates the ringing circuit which provides an audible and/or visual indication as desired of an impending incoming call on line 4 in the familiar manner. It is recalled at this moment that the telephone apparatus is presently adjusted to the high impedance state as the telephone transmission equipment is still operated to onhook.

As a result of the connection of the ringing generator to the telephone apparatus as just mentioned, positive cycles of the local ringing current are transmitted, for example, through the bridge rectifier network via its one terminal 27, diode 31, relay operating winding 35 and diode 32 to its other terminal 26; and negative cycles of the local ringing current are transmitted through the bridge network via its other terminal 26, diode 30, relay operating winding 35 and diode 33 to its one terminal 27. Due to the high resistance of the ringing circuit as previously mentioned, the amount of ringing voltage rectified via the rectifier bridge network and capacitor 37 is insufficient to energize operating winding 35 whereupon relay 34 remains unoperated. This allows its normally closed contact 34*a* to remain engaged with fixed contact 36 included in the rectifying circuit previously identified. As a consequence, the local ringing voltage continues to activate the ringing circuit in correspondence with the incoming ringing voltage still effective at the carrier terminal ring and ground terminals for providing a continuing ringing indication of the impending call. The local ring cycle coincides substantially identically with that applied at the central office.

At the instant the called party responds to such ringing indication by operating the telephone transmission equipment to offhook by picking up the telephone receiver, switch 9 included in the latter equipment is closed to establish the above-noted 200-ohm circuit in shunt of the 2000-ohm ringing circuit. If this occurs during the silent interval, i.e., when relay 13 is unoperated, direct current begins to flow as usual in the direct current connection between the carrier terminal and telephone apparatus tip and ring terminals whereby ringing is tripped at the central office in the well-known manner. When, however, the telephone transmission equipment is operated to offhook during the ringing cycle, the 200-ohm talking circuit shunts the 2000-ohm ringing circuit thereby permitting a flow of an increased amount of local ringing current. This causes an increase in the magnitude of the rectified voltage across capacitor 37 which supplies sufficient current to energize operating winding 35 to operate relay 34. As this relay operates, it disengages its normally closed contact 34*a* from its associated fixed contact 36 to interrupt the energizing current for the operating winding 14 of relay 13 which returns to the unoperated condition. This interrupts immediately the incoming ringing voltage effective at the carrier terminal ring and ground terminals. As relay 13 returns to the unoperated state, it actuates its transfer contacts 13*a* and 13*b* from associated fixed contacts 19 and 21, respectively, to associated fixed contacts 18 and 20, respectively. This interrupts at once the local ringing voltage and reestablishes the direct current circuit between the carrier terminal and telephone apparatus tip and ring terminals whereby the called party at the customer's telephone apparatus is enabled to talk via the latter circuit with the calling party connected via the central office to signaling line 4. When the called party returns the telephone receiver to its cradle, switch 9 is reopened to reestablish the high impedance state in the customer's telephone apparatus via the ringing circuit alone in anticipation of the next incoming ringing voltage.

The magnitude of the effective resistance of fixed resistor 29 is so predetermined relative to the magnitude of the resistance of the ringing circuit that the rectified voltage produced by the bridge rectifier network is insufficient to energize relay operating winding 35 while the telephone transmission equipment is operated to onhook. In other words, the effective resistance of resistor 29 is small compared with that of the ringing circuit when the telephone transmission equipment is operated to onhook, and the rectified direct current voltage thus provided across operating winding 35 is insufficient to operate relay 34. Capacitor 37 serves to smooth or filter the direct current voltage across operating winding 35 thereby preventing an operation of relay on peaks of the ringing voltage. This precludes a premature interruption of the incoming ringing voltage at the carrier terminal ring and ground terminals. Once the telephone transmission equipment is operated offhook, thus adjusting the telephone apparatus to the low impedance state, the effective resistance of resistor 29 is large compared with that of the talking circuit via the telephone transmission equipment, and most of the ringing voltage is impressed across the rectifier bridge network including resistor 29. Thus, this resistor prevents ringing interruption when the telephone transmission equipment is onhook during the ringing cycle; it also provides a means for instantly detecting an inadvertent offhook state of a telephone transmission equipment during a ringing cycle by the immediate removal of the ringing voltage therefrom. In those instances in which the effective resistance of the ringing circuit is precisely determined for such purpose, resistor 29 may be omitted from the rectifier bridge network. The use of resistor 29 thus enables an electrical design of the ringing circuit to provide only an approximation of the effective resistance required to control the ringing cycle in the manner hereinbefore explained. It is understood that the invention herein is described in specific respects for the purpose of description. It is also understood that such respects are merely illustrative of the application of the principles of the invention. Numerous other arrangements may be devised by those skilled in the art without departing from the spirit and scope of the invention.

I claim:

1. A telephone customer's terminal comprising:

a signaling line for transmitting incoming ringing voltage, telephone apparatus having a high impedance onhook state and a low impedance offhook state, said apparatus including tip and ring terminals, a ringer connected across said tip and ring terminals, and a low impedance talking circuit, said talking circuit being connected in shunt with said ringer when said apparatus is in said offhook state to provide, in parallel with said ringer, the low impedance of said offhook state, said talking circuit being disconnected from its shunt relation with said ringer when said apparatus is in said onhook state, whereby said ringer provides the high impedance of said onhook state, a carrier terminal unit for terminating said line with tip, ring and ground terminals whereby incoming ringing voltage on said line is applied to said last-mentioned ring and ground terminals, and control means for controlling the application of a local ringing voltage to said apparatus tip and ring terminals to activate said ringer in correspondence with said incoming ringing voltage at said carrier terminal unit ring and ground terminals, said control means comprising a first electromagnetic relay having an operating winding and two transfer contacts, each movable between a first pair of fixed contacts, with a first fixed contact of a first pair of fixed contacts being connected to said carrier terminal tip terminal and said transfer contact associated with said last-mentioned first contact pair being connected to said apparatus tip terminal, and further with a first fixed contact of a second pair of said fixed contacts being connected to said carrier terminal ring terminal and said transfer contact associated with said last-mentioned second contact pair being connected to said apparatus ring terminal, a first unidirectional device, a second electromagnetic relay having an operating winding and a fifth fixed contact and a movable contact, circuit means connecting said first relay winding, said first device and said last-mentioned fifth fixed contact and movable contact in a series circuit with said carrier terminal ring and ground terminals, a local generator for supplying said local ringing voltage and having one terminal connected to said second contact of said first contact pair, a rectifier bridge connecting said second relay operating winding between a second contact of said second pair of contacts and a second terminal of said generator, said bridge having two terminals of which a first is connected to said last-mentioned second contact and of which a second is connected to said generator terminal, and a plurality of parallel branches connected between said bridge first and second terminals, a first of said branches including second and third unidirectional devices connected in series between said first and second bridge terminals and poled toward each other, a second of said branches including fourth and fifth unidirectional devices connected in series between said first and second bridge terminals and poled away from each other, said second relay operating winding having one end connected to a point common to said second and third devices and an opposite end connected to a point common to said fourth and fifth devices, said control means maintaining said first relay operating winding in said circuit means operatively connected with said carrier terminal ring and ground terminals when said apparatus is in said onhook state, and said first relay operating winding being deenergized in absence of said incoming voltage at said carrier terminal unit ring and ground terminals to engage said two transfer contacts with said first contacts of said first and second contact pairs to establish a direct current circuit between said carrier terminal unit and said apparatus tip and ring terminals, said control means further maintaining said second relay winding deenergized for causing said second relay to engage said movable contact with said fifth fixed contact to close said circuit means series circuit while said apparatus is in said onhook state, said incoming ringing voltage, when applied to said carrier terminal unit ring and ground terminals, being effective to energize said first relay operating winding to operate said first relay to actuate said two transfer contacts to engage said second contacts of said first and second contact pairs to apply ringing voltage from said generator through said bridge to said apparatus tip and ring terminals for activating said ringer while said apparatus is in said onhook state, said bridge rectifying said local ringing voltage to energize said second relay operating winding for operating said second relay to disengage said movable contact from said fifth fixed contact for opening said circuit means series circuit to operatively disconnect said first relay operating winding in said circuit means from said last-mentioned terminals and at the same time to disconnect said generator from said apparatus tip and ring terminals for deactivating said ringer when said apparatus is transferred to said offhook state.

2. A telephone subscribers terminal comprising a telephone apparatus having a high impedance onhook state and a relatively low impedance offhook state, a signal receiver and transmitter carrier terminal unit adapted to be connected to a central office by a signal transmission line, said carrier terminal unit and said apparatus being respectively provided with a first pair of tip and ring talking circuit terminals and a second pair of tip and ring talking circuit terminals, a ringing circuit forming a part of said apparatus and being connected across the terminals of said second pair in both of said onhook and offhook states of said apparatus, said carrier unit terminating said transmission line at said first pair of terminals and a further terminal to provide for the application of a central office-produced ringing voltage across said further terminal and one predetermined terminal of said first pair, ringing generator means providing a source of local ringing voltage, transfer means providing a signal transmitting talking circuit between said first and second pairs of terminals in absence of said central office-produced ringing voltage, said transfer means being responsive to the application of said central office-produced ringing signal voltage across said further terminal and said predetermined terminal of said carrier unit for interrupting said circuit connection between said first and second pairs of terminals and for connecting said ringing generator means to the terminals of said second pair to impress said local ringing voltage upon said ringing circuit and thereby signal an incoming call when said apparatus is in said onhook state, said apparatus providing a low impedance current path when transferred to said offhook state to increase the current drawn from said generator means, means including a device responsive to said increase in current that is drawn from said generator means when said apparatus is transferred to said offhook state to condition said transfer means for reestablishing said circuit connection between said first and second pairs of terminals and for disconnecting said generator means from the terminals of said second pair, first relay means forming a part of said transfer means and having an operating winding, switching means connecting said operating winding across said one predetermined carrier unit terminal and said further terminal to provide for the energization of said operating winding by said central office-produced ringing voltage, transfer contact means forming a part of said first relay means and being under the control of said operating winding to provide a signal-transmitting current path between said first and second pairs of terminals in absence of said central office-produced ringing voltage, said generator means having a pair of output terminals, one of which is directly connected to said transfer contact means, said means including said device further comprising bridge rectifier means having a pair of input terminals and a pair of output terminals, said device comprising second relay means having an operating winding bridging the output terminals of said bridge rectified means, one of the input terminals of said rectifier means being connected to the other of the output terminals of said generator means, and the other of the input terminals of said rectifier means being connected to said transfer contact means, said transfer contact means being actuated by energization of said operating winding of said first relay means to disconnect said first pair of terminals from said second pair of terminals and to connect said other of said input terminals of said rectifier means and said one of said output terminals of said generator means to said second pair of terminals, the operating winding of said second relay means being energized by the increased current drawn from said generator means when said apparatus is transferred to said offhook state, and said switching means being actuated by energization of the operating winding of said second relay means to interrupt the energizing connection of the winding of said first relay means to said further terminal and said predetermined one of said carrier unit terminals, and resistor means bridging the input terminals of said rectifier means, said resistor means having a predetermined resistance value which is less than that of said ringing circuit to provide a voltage drop across the output terminals of said rectifier means which is insufficient to energize the winding of said second relay means when said apparatus is in said onhook state.

3. A telephone customer's terminal comprising:

a signalling transmission line, telephone apparatus having a high impedance onhook state and a low impedance offhook state, said apparatus including tip and ring terminals and a high impedance ringer connected across said tip and ring terminals, a carrier terminal unit connected to said line and having tip, ring and ground terminals with talking voltages being applied at said last-mentioned tip and ring terminals and incoming ring voltage being applied at said last-mentioned ring and ground terminals, control means for applying a local ringing voltage to said apparatus tip and ring terminals in response to the application of said incoming ringing voltage to said carrier terminal unit ring and ground terminals, comprising;

a first electromagnetic relay having an operating winding effectively connectable to and disconnectable from said carrier terminal ring and ground terminals and having a plurality of transfer contacts movable between a plurality of pairs of fixed contacts, with one fixed contact of a first pair of said fixed contacts being connected to said carrier terminal tip terminal and said transfer contact associated with said last-mentioned first contact pair being connected to said apparatus tip terminal, and further with one fixed contact of a second pair of said fixed contacts being connected to said carrier terminal ring terminal and said transfer contact associated with said last-mentioned contact pair being connected to said apparatus ring terminal, and a local generator providing a source of ringing voltage and being connected to second contacts of said first and second contact pairs, said control means being operative to complete a circuit connecting said operating winding to said carrier terminal ring and ground terminals in a normally deenergized state to engage said transfer contacts with said one contact of said first and second contact pairs for establishing a direct current circuit between said carrier terminal unit and apparatus tip and ring terminals for said talking voltages when said apparatus is in said onhook state, said operating winding being energized by the application of said incoming ringing voltage at said carrier terminal ring and ground terminals for operating said transfer contacts to engage said second contacts of said first and second contact pairs thereby applying ringing voltage from said generator across said apparatus tip and ring terminals for activating said ringer while said apparatus is in said onhook state, said control means being responsive to the transfer of said apparatus from said onhook state to said offhook state to disconnect said operating winding from said carrier terminal ring and ground terminals to deenergize said last-mentioned operating winding for causing said relay to return to the unoperated condition to actuate said transfer contacts to reengage said one contact of said first and second contact pairs thereby reestablishing said direct current circuit for said talking voltages and at the same time interrupting the application of said local ringing voltage at said apparatus tip and ring terminals to deactivate said ringer, said control means further comprising a rectifying circuit including said relay operating winding and being responsive to said incoming ringing voltage at said carrier terminal ring and ground terminals for providing sufficient rectified voltage to energize said relay operating winding, said rectifying circuit having rectifying means serially connected with said relay operating winding, said rectifying circuit further including contact means serially connected with said operating winding and rectifying means, said contact means of said rectifying circuit being normally closed to complete a current path in said rectifying circuit, said contact means being actuated by said control means to open said rectifying circuit when said apparatus is transferred to said offhook state, said control means further comprising a second electromagnetic relay having a fifth fixed contact and a movable contact constituting said contact means in said rectifying circuit, said second relay also having an operating winding connected between said generator and said second contact of said second contact pair, said second relay operating winding, when deenergized, holding said second relay unoperated to engage said last-mentioned movable contact to disengage said last-mentioned fifth fixed contact thereby opening said rectifying circuit, said control means further comprising a rectifier bridge connecting said second relay operating winding between said generator and said second contact of said second contact pair, said bridge comprising a pair of terminals of which a first is connected to said generator and of which a second is connected to said second contact of said second contact pair, and a plurality of branches connected in parallel between said first and second bridge terminals and having a first branch including first and second unidirectional devices connected in series and poled in directions toward each other and a second branch including third and fourth unidirectional devices connected in series and poled in directions away from each other, said second relay operating winding having one end connected to a point common to said first and second devices and an opposite end to a point common to said third and fourth devices, and said rectifier bridge also including a resistor constituting a third branch and connected in parallel with said first and second branches between said rectifier bridge first and second terminals.